United States Patent
Kovach et al.

(10) Patent No.: US 8,272,463 B2
(45) Date of Patent: Sep. 25, 2012

(54) ELECTRO-HYDRAULIC MACHINE FOR HYBRID DRIVE SYSTEM

(75) Inventors: Joseph A. Kovach, Aurora, OH (US); Russell J. Wakeman, Canton, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 688 days.

(21) Appl. No.: 12/358,309

(22) Filed: Jan. 23, 2009

(65) Prior Publication Data

US 2009/0270221 A1    Oct. 29, 2009

Related U.S. Application Data

(60) Provisional application No. 61/022,926, filed on Jan. 23, 2008.

(51) Int. Cl.
*B60K 6/20* (2007.10)

(52) U.S. Cl. ............... 180/65.27; 903/930; 180/65.275

(58) Field of Classification Search ............... 180/165, 180/54.1, 65.1, 65.21–65.22, 65.25, 65.28, 180/65.275, 65.285, 305, 306–307
See application file for complete search history.

(56) References Cited

U.S. PATENT DOCUMENTS

| | | | |
|---|---|---|---|
| 3,704,760 A | 12/1972 | Maruyama | |
| 3,923,115 A | 12/1975 | Helling | |
| 4,305,254 A * | 12/1981 | Kawakatsu et al. | 60/716 |
| 4,335,429 A * | 6/1982 | Kawakatsu | 701/102 |
| 4,407,132 A * | 10/1983 | Kawakatsu et al. | 60/716 |
| 5,669,842 A | 9/1997 | Schmidt | |
| 6,059,059 A * | 5/2000 | Schmidt-Brucken | 180/65.23 |
| 6,251,042 B1 * | 6/2001 | Peterson et al. | 477/3 |
| 6,258,006 B1 | 7/2001 | Hanyu et al. | |
| 6,328,122 B1 * | 12/2001 | Yamada et al. | 180/65.23 |
| 6,416,437 B2 * | 7/2002 | Jung | 475/8 |
| 6,598,496 B2 | 7/2003 | Pannell | |
| 6,664,751 B1 * | 12/2003 | Gabriel et al. | 318/599 |
| 6,752,225 B2 | 6/2004 | Kojima | |
| 6,755,266 B2 * | 6/2004 | Lasson | 180/65.235 |
| 6,784,563 B2 * | 8/2004 | Nada | 290/40 C |
| 6,834,737 B2 * | 12/2004 | Bloxham | 180/165 |
| 6,920,948 B2 * | 7/2005 | Sugiura et al. | 180/65.28 |
| 7,053,498 B1 * | 5/2006 | Boisvert et al. | 290/40 R |

(Continued)

FOREIGN PATENT DOCUMENTS

DE    3536247 A1    4/1987
WO    2006055978 A1    5/2006

OTHER PUBLICATIONS

"Hydraulic Hybrid Vehicle," http://hybrid-cars.carhelpx.com/Hydraulic-Hybrid-Vehicle.html, Feb. 14, 2008.

(Continued)

*Primary Examiner* — John Walters
*Assistant Examiner* — James Triggs
(74) *Attorney, Agent, or Firm* — MacMillan, Sobanski & Todd, LLC

(57) ABSTRACT

A combined hybrid drive system and electro-hydraulic machine includes a hybrid drive system that is adapted to decelerate a rotatably driven mechanism, accumulate the energy resulting from such deceleration, and use the accumulated energy to subsequently accelerate the rotatably driven mechanism. An electro-hydraulic machine is operatively connected to the hybrid drive system and is adapted to be operated in one or more of a plurality of modes to improve the performance of the hybrid drive system.

17 Claims, 1 Drawing Sheet

U.S. PATENT DOCUMENTS

| | | | |
|---|---|---|---|
| 7,201,095 B2 * | 4/2007 | Hughey | 91/408 |
| 7,264,070 B2 | 9/2007 | Shimizu | |
| 7,304,445 B2 * | 12/2007 | Donnelly | 318/108 |
| 2004/0220015 A1 | 11/2004 | Murakami et al. | |
| 2006/0116797 A1 | 6/2006 | Moran | |

OTHER PUBLICATIONS

International Search Report, PCT/US2009/031750, filed Jan. 23, 2009.

* cited by examiner

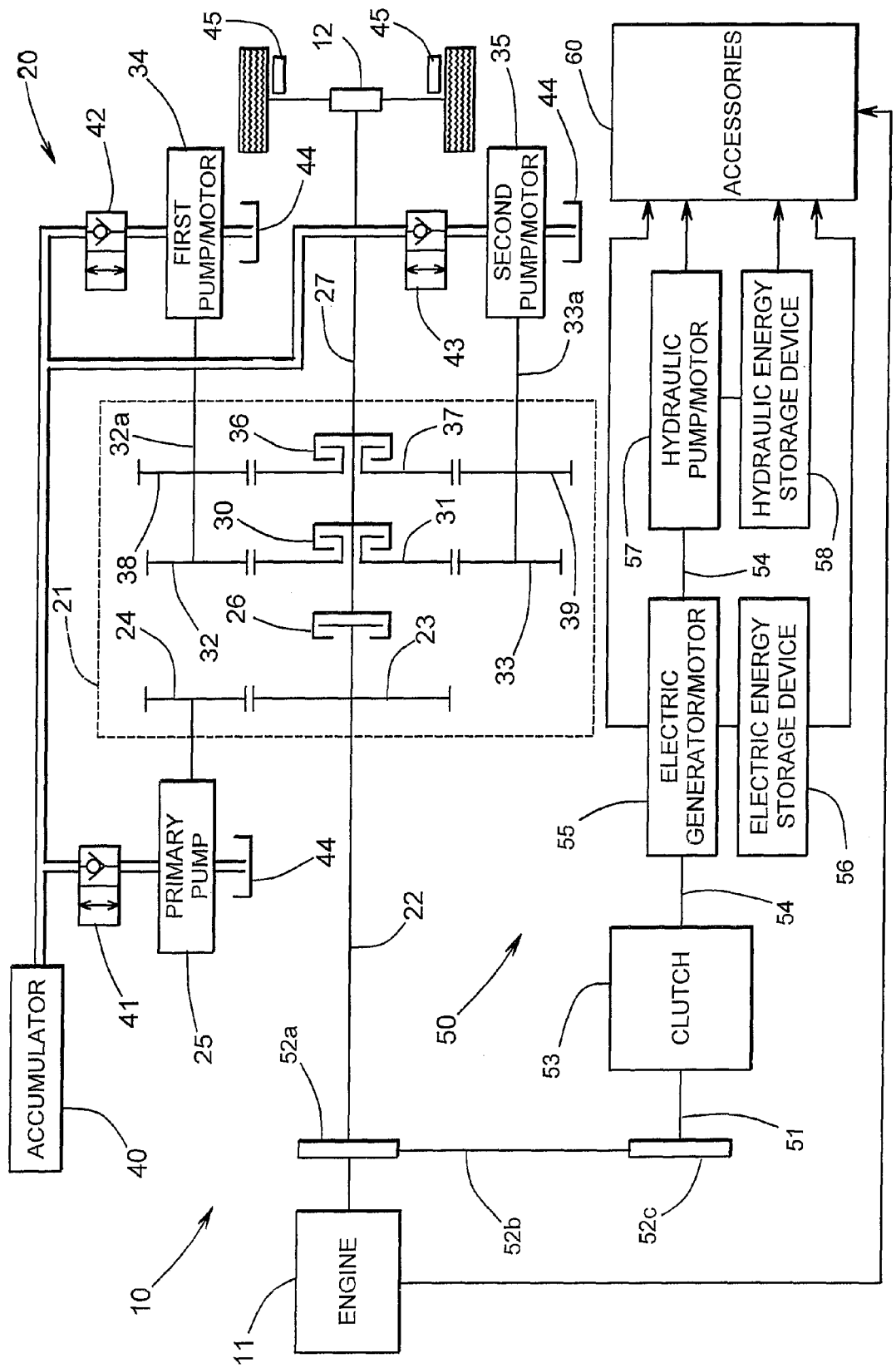

ELECTRO-HYDRAULIC MACHINE FOR HYBRID DRIVE SYSTEM

CROSS-REFERENCE TO RELATED APPLICATIONS

This application claims the benefit of U.S. Provisional Application No. 61/022,926 filed Jan. 23, 2008, the disclosure of which is incorporated herein by reference.

BACKGROUND OF THE INVENTION

This invention relates in general to hybrid drive systems for vehicles and other mechanisms. In particular, this invention relates to an electro-hydraulic machine for use with such a hybrid drive system.

Drive train systems are widely used for generating power from a source and for transferring such power from the source to a driven mechanism. Frequently, the source generates rotational power, and such rotational power is transferred from the source of rotational power to a rotatably driven mechanism. For example, in most land vehicles in use today, an engine generates rotational power, and such rotational power is transferred from an output shaft of the engine through a driveshaft to an input shaft of an axle so as to rotatably drive the wheels of the vehicle.

In some vehicles and other mechanisms, a hybrid drive system is provided in conjunction with the drive train system for accumulating energy during braking of the rotatably driven mechanism and for using such accumulated energy to assist in subsequently rotatably driving the rotatably driven mechanism. To accomplish this, a typical hybrid drive system includes an energy storage device and a reversible energy transfer machine. The reversible energy transfer machine communicates with the energy storage device and is mechanically coupled to a portion of the drive train system. Typically, the hybrid drive system can be operated in either a retarding mode, a neutral mode, or a driving mode. In the retarding mode, the reversible energy transfer machine of the hybrid drive system accumulates energy by braking or otherwise retarding the rotatably driven mechanism of the drive train system and stores such energy in the energy storage device. In the neutral mode, the hydraulic drive system is disconnected from the drive train system and, therefore, is substantially inoperative to exert any significant driving or retarding influence on the rotatably driven mechanism. In the driving mode, the reversible energy transfer machine of the hybrid drive system supplies the accumulated energy previously stored in the energy storage device to assist in subsequently rotatably driving the rotatably driven mechanism.

One commonly known hybrid drive system uses pressurized fluid as the actuating mechanism. In such a hydraulic hybrid drive system, a fluid energy storage device (such as an accumulator) and a reversible hydraulic machine are provided. Another commonly known hybrid drive system uses electricity as the actuating mechanism. In such an electric hybrid drive system, an electrical energy storage device (such as a battery) and a reversible electric machine are provided. Other hybrid drive systems are known in the art that use other actuating mechanisms.

Regardless of the specific actuating mechanism that is used, the hybrid drive system can improve the performance of the drive train system (such as fuel economy, for example) by recovering and storing energy during deceleration and by retrieving and supplying the stored energy for use during a subsequent acceleration. However, the hybrid drive system does not improve the performance of the drive train system during idle situations, such as when a vehicle in which the drive train system is provided is not moving. During such idle situations, the performance of the drive train system can be improved by turning off the engine. However, the drive train system may include one or more accessories that may be necessary or desirable to be operated while the engine is not operated. Such accessories can be electrically operated (such as lighting systems, navigation systems, audio systems, and the like), hydraulically operated (such as steering systems, braking systems, air conditioning systems, and the like), or a combination thereof. Thus, it would be desirable to provide an improved structure for a hybrid drive system that is capable of operating such accessories while the engine is not operated.

SUMMARY OF THE INVENTION

This invention relates to a combined hybrid drive system and electro-hydraulic machine. The hybrid drive system is adapted to decelerate a rotatably driven mechanism, accumulate the energy resulting from such deceleration, and use the accumulated energy to subsequently accelerate the rotatably driven mechanism. The electro-hydraulic machine is operatively connected to the hybrid drive system and is adapted to be operated in one or more of a plurality of modes to improve the performance of the hybrid drive system.

Various aspects of this invention will become apparent to those skilled in the art from the following detailed description of the preferred embodiment, when read in light of the accompanying drawings.

BRIEF DESCRIPTION OF THE DRAWINGS

The sole FIGURE is a schematic diagram of a drive train system including a hybrid drive system and an electro-hydraulic machine in accordance with this invention.

DETAILED DESCRIPTION OF THE PREFERRED EMBODIMENT

Referring now to the drawings, there is illustrated in FIG. 1 a drive train system, indicated generally at 10, for generating power from a source and for transferring such power from the source to a driven mechanism. The illustrated drive train system 10 is a vehicular drive train system that includes an engine 11 that generates rotational power to an axle assembly 12 by means of a hybrid drive system, indicated generally at 20. However, the illustrated vehicle drive train system 10 is intended merely to illustrate one environment in which this invention may be used. Thus, the scope of this invention is not intended to be limited for use with the specific structure for the vehicular drive train system 10 illustrated in FIG. 1 or with vehicle drive train systems in general. On the contrary, as will become apparent below, this invention may be used in any desired environment for the purposes described below.

The illustrated hybrid drive system 20 includes a power drive unit 21 that is connected between the engine 11 and the axle assembly 12. The illustrated power drive unit 21 is, in large measure, conventional in the art and is intended merely to illustrate one environment in which this invention may be used. Thus, the scope of this invention is not intended to be limited for use with the specific structure for the power drive unit 21 illustrated in FIG. 1. The illustrated power drive unit 21 includes an input shaft 22 that is rotatably driven by the engine 11. An input gear 23 is supported on the input shaft 22 for rotation therewith. The input gear 23 is connected for rotation with a primary pump drive gear 24 that, in turn, is connected for rotation with an input shaft of a primary pump 25. Thus, the primary pump 25 is rotatably driven whenever the engine 11 is operated. The purpose of the primary pump 25 will be explained below.

The illustrated power drive unit 21 also includes a main drive clutch 26 that selectively connects the input shaft 22 to an output shaft 27. When the main drive clutch 26 is engaged, the input shaft 22 is connected for rotation with the output shaft 27. When the main drive clutch 26 is disengaged, the input shaft 22 is not connected for rotation with the output shaft 27. The output shaft 27 is connected for rotation with an input shaft of the axle assembly 12. Thus, the axle assembly 12 is rotatably driven by the engine 11 whenever the main drive clutch 26 is engaged.

The illustrated power drive unit 21 further includes a low drive clutch 30 that selectively connects the output shaft 27 to a low drive clutch gear 31. The low drive clutch output gear 31 is connected for rotation with both a first low drive output gear 32 and a second low drive output gear 33. The first low drive output gear 32 is connected for rotation with a first shaft 32a that, in turn, is connected for rotation with an input shaft of a first pump/motor 34. Similarly, the second low drive output gear 33 is connected for rotation with a second shaft 33a that, in turn, is connected for rotation with an input shaft of a second pump/motor 35. Thus, when both the main drive clutch 26 and the low drive clutch 30 are engaged, the output shaft 27 rotatably drives both the first pump/motor 34 and the second pump motor 35. The purpose for both the first pump/motor 34 and the second pump motor 35 will be explained below.

Similarly, the illustrated power drive unit 21 further includes a high drive clutch 36 that selectively connects the output shaft 27 to a high drive clutch gear 37. The high drive clutch output gear 37 is connected for rotation with both a first high drive output gear 38 and a second high drive output gear 39. The first high drive output gear 38 is connected for rotation with the first shaft 32a that, as mentioned above, is connected for rotation with the input shaft of the first pump/motor 34. Similarly, the second high drive output gear 39 is connected for rotation with the second shaft 33a that, as also mentioned above, is connected for rotation with the input shaft of the second pump/motor 35. Thus, when both the main drive clutch 26 and the high drive clutch 36 are engaged, the output shaft 27 rotatably drives both the first pump/motor 34 and the second pump motor 35. The low drive gears 31, 32, and 33 are selected to provide a relatively low gear ratio when the main drive clutch 26 and the low drive clutch 30 are engaged, in comparison with the relatively high gear ratio provided by the high drive gears 37, 28, and 39 when the main drive clutch 26 and the high drive clutch 36 are engaged.

The illustrated power drive unit 21 also includes an accumulator 40 or similar relatively high fluid pressure storage device. The accumulator 40 selectively communicates with a first port of the primary pump 25 through a primary pump valve 41. The primary pump valve 41 is conventional in the art and can be operated in a first position (shown in FIG. 1), wherein fluid communication from the accumulator 40 to the first port of the primary pump 25 is prevented and fluid communication from the first port of the primary pump 25 to the accumulator 40 is permitted. However, the primary pump valve 41 can be operated in a second position (to the right when viewing FIG. 1), wherein fluid communication from the accumulator 40 to the first port of the primary pump 25 is permitted and fluid communication from the first port of the primary pump 25 to the accumulator 40 is permitted. For the purposes of this invention, the primary pump valve 41 is always maintained in the illustrated first position, wherein fluid communication from the accumulator 40 to the first port of the primary pump 25 is prevented and fluid communication from the first port of the primary pump 25 to the accumulator 40 is permitted.

The accumulator 40 also selectively communicates with a first port of the first pump/motor 34 through a first control valve 42. The first control valve 42 is conventional in the art and can be operated in a first position (shown in FIG. 1), wherein fluid communication from the first port of the first pump/motor 34 to the accumulator 40 is permitted and fluid communication from the accumulator 40 to the first port of the first pump/motor 34 is prevented. However, the first control valve 42 can be operated in a second position (to the right when viewing FIG. 1), wherein fluid communication from the first port of the first pump/motor 34 to the accumulator 40 is permitted and fluid communication from the accumulator 40 to the first port of the first pump/motor 34 is permitted.

The accumulator 40 further selectively communicates with a first port of the second pump/motor 35 through a second control valve 43. The second control valve 43 is conventional in the art and can be operated in a first position (shown in FIG. 1), wherein fluid communication from the first port of the second pump/motor 35 to the accumulator 40 is permitted and fluid communication from the accumulator 40 to the first port of the second pump/motor 35 is prevented. However, the second control valve 43 can be operated in a second position (to the right when viewing FIG. 1), wherein fluid communication from the first port of the second pump/motor 35 to the accumulator 40 is permitted and fluid communication from the accumulator 40 to the first port of the second pump/motor 35 is permitted.

The illustrated power drive unit 21 further includes a reservoir 44 or similar relatively low fluid pressure storage device. Each of the primary pump 25, the first pump/motor 34, and the second pump/motor 35 includes a second port, and all of such second ports communicate with the reservoir 44 to draw fluid therefrom when necessary, as described below.

The basic operation of the drive train system 10 will now be described. When the engine 11 of the drive train system 10 is initially started, the main drive clutch 26, the low drive clutch 30, and the high drive clutch 36 are all disengaged, and the valves 41, 42, and 43 are all in their first positions illustrated in FIG. 1. In this initial condition, the engine 11 rotatably drives the primary pump 25 through the input shaft, the input gear 23, and the primary pump drive gear 24, as described above. As a result, the primary pump 25 draws fluid from the reservoir 44 through the second port thereof, and further supplies such fluid under pressure from the first port of the primary pump 25 through the primary pump valve 41 to the accumulator 40. As discussed above, the first and second control valves 42 and 43 prevent the pressurized fluid from the primary pump 25 or the accumulator 40 from being supplied to the first ports of the first and second pump/motors 34 and 35, respectively. Such initially operation continues until a sufficient amount of such pressurized fluid has been supplied to the accumulator 40. Because the main drive clutch 26, the low drive clutch 30, and the high drive clutch 36 are all disengaged, the engine 11 does not rotatably drive the output shaft 27 or the axle assembly 12 in this initial operation of the drive train system 10.

When it is desired to move the vehicle, the low drive clutch 30 is engaged, while the main drive clutch 26 and the high drive clutch 36 remain disengaged. As a result, the output shaft 27 is connected to the low drive clutch gear 31 for concurrent rotation. At the same time, the first control valve 42 and the second control valve 43 are each moved to their second positions. This permits pressurized fluid from the accumulator 40 to flow to the first ports of both the first pump/motor 34 and the second pump/motor 35. Lastly, the first and second pump/motors 34 and 35 are each placed in a positive displacement mode, wherein they function as motors to use the pressurized fluid supplied by the accumulator 40 to rotatably drive the first and second shafts 32a and 33a. In turn, this causes the low drive gears 31, 32, and 33 and the output shaft 27 to be rotatably driven. As a result, the axle assembly 12 is rotatably driven at the relatively low gear ratio provided by the low drive gears 31, 32, and 33. Such a relatively low gear ratio is well suited for providing the relatively high torque needed to accelerate the vehicle from a standstill.

Once it has begun to move, it may be desirable to move the vehicle at a higher speed that is suitable for the relatively low gear ratio provided by the low drive gears 31, 32, and 33. In this instance, the power drive unit 21 can be operated to disengage the low drive clutch 30 and engage the high drive clutch 36, while maintaining the main drive clutch 26 disengaged. As a result, the output shaft 27 is connected to the high drive clutch output gear 37 for concurrent rotation. The first control valve 42 and the second control valve 43 are each moved to (or maintained in) their second positions. As described above, this permits pressurized fluid from the accumulator 40 to flow to the first ports of both the first pump/motor 34 and the second pump/motor 35. As also described above, the first and second pump/motors 34 and 35 are each placed (or maintained) in a positive displacement mode, wherein they function as motors to use the pressurized fluid supplied by the accumulator 40 to rotatably drive the first and second shafts 32a and 33a. In turn, this causes the high drive gears 37, 38, and 39 and the output shaft 27 to be rotatably driven. As a result, the axle assembly 12 is rotatably driven at the relatively low gear ratio provided by the high drive gears 37, 38, and 39. Such a relatively high gear ratio is well suited for providing the relatively low torque needed to accelerate the vehicle to a relatively high speed.

If it is desired to operate the vehicle at a further higher speed, the power drive unit 21 can be operated to disengage the high drive clutch 36 and engage the main drive clutch 26, while the low drive clutch 30 remains disengaged. As a result, the output shaft 27 is connected to the input shaft 22 for concurrent rotation. At the same time, the first control valve 42 and the second control valve 43 are each moved to their first positions. As described above, this prevents pressurized fluid from the accumulator 40 from flowing to the outputs of both the first pump/motor 34 and the second pump/motor 35. As a result, the first and second pump/motors 34 and 35 are isolated from the drive train system 10.

Under certain circumstances, the above-described components of the hybrid drive system 20 can also be used to slow or stop the movement of the vehicle. To accomplish this, the main drive clutch 26 and the low drive clutch 30 are disengaged, while the high drive clutch 36 is engaged (in some instances, it may be preferable that the main drive clutch 26 and the high drive clutch 36 be disengaged, while the low drive clutch 30 is engaged). Regardless, the first control valve 42 and the second control valve 43 are each moved to (or maintained in) their second positions. This permits pressurized fluid from the first ports of both the first pump/motor 34 and the second pump/motor 35 to flow to the accumulator 40. Lastly, the first and second pump/motors 34 and 35 are each placed in a negative displacement mode, wherein they function as pumps to use the rotational energy of the rotating output shaft 27 to supply pressurized fluid to the accumulator 40. As a result, the output shaft 27 rotates the high drive gears 37, 38, and 39, which causes the first pump/motor 34 and the second pump/motor 35 to be rotatably driven. Consequently, the rotation of the axle assembly 12 is decelerated as the kinetic energy thereof is stored as fluid pressure in the accumulator 40.

It is often desirable to provide a separate brake system to affirmatively slow or stop the rotation of the axle assembly 12. As shown in FIG. 1, such a separate brake system is provided within the axle assembly 12 of the illustrated drive train system 10 as a pair of friction brakes 45 associated with respective wheels of the vehicle. The friction brakes 45 are conventional in the art and may be actuated in any desired manner, such as pneumatically or hydraulically.

In the illustrated hybrid drive system 20, pressurized fluid is used as the actuating mechanism. In such a hydraulic hybrid drive system, the accumulator 40 functions as the energy storage device, and the pump/motors 34 and 35 function as reversible hydraulic machines. Another commonly known hybrid drive system uses electricity as the actuating mechanism. In such an electric hybrid drive system, an electrical energy storage device (such as a capacitor or a battery) and a reversible electrical machine (such as generator/motor) are provided and function in a similar manner as described above. This invention is not intended to be limited to the specific structure of the hybrid drive system, but rather is intended to cover any similar structures.

The illustrated hybrid drive system 20 further includes an electro-hydraulic machine, indicated generally at 50, in accordance with this invention. The illustrated electro-hydraulic machine 50 includes an input shaft 51 that is connected for rotation with the input shaft 22 of the power drive unit 21 that, as described above, can be rotatably driven by the engine 11. In the illustrated embodiment, the input shaft 51 of the clutch 55 is connected for rotation with the input shaft 22 of the power drive unit 21 by a first pulley 52a, a belt 52b, and a second pulley 52c. The first pulley 52a is mounted on or otherwise connected for rotation with the input shaft 22 of the power drive unit 21. The second pulley 52c is mounted on or otherwise connected for rotation with the input shaft 51 of the electro-hydraulic machine 50. The belt 52b extends about the first pulley 52a and the second pulley 52c such that the first and second pulleys 52a and 52c are connected for rotation together. In this manner, the input shaft 51 of the electro-hydraulic machine 50 is connected for rotation with the input shaft 22 of the power drive unit 21. However, the input shaft 51 of the clutch 55 can connected for rotation with the input shaft 22 of the power drive unit 21 by any desired structure including, for example, gears, shafts or a direct drive arrangement.

The input shaft 51 of the electro-hydraulic machine 50 is selectively connected through a clutch 53 to an output shaft 54 of the electro-hydraulic machine 50. The clutch 53 is conventional in the art and is adapted to selectively connect the input shaft 51 for rotation with the output shaft 54. When the clutch 53 is engaged, the input shaft 51 and the output shaft 54 are connected for rotation together. When the clutch 51 is disengaged, the input shaft 51 and the output shaft 54 are not connected for rotation together.

The output shaft 54 is connected for rotation with an electric generator/motor 55 that, in turn, is electrically connected to an electric energy storage device 56. The electric generator/motor 55 is conventional in the art and is responsive to rotational power supplied from the output shaft 54 for generating electrical power to the electric energy storage device 56. The electric energy storage device 56 is also conventional in the art and may be embodied as any desired device that can store electrical energy, such as a battery or a capacitor. The electric generator/motor 55 is also responsive to electrical power supplied from the electric energy storage device 56 for rotatably driving the output shaft 54. The purpose for and manner of operation of the electric generator/motor 55 and the electric energy storage device 56 will be explained below.

The output shaft 54 is also connected for rotation with a hydraulic pump/motor 57 that, in turn, is hydraulically connected to a hydraulic energy storage device 58. The hydraulic pump/motor 57 is conventional in the art and is responsive to rotational power supplied from the output shaft 54 for generating hydraulic power to the hydraulic energy storage device 58. The hydraulic energy storage device 58 is also conventional in the art and may be embodied as any desired device that can store hydraulic energy, such as an accumulator. The hydraulic generator/motor 57 is also responsive to hydraulic power supplied from the hydraulic energy storage device 58 for rotatably driving the output shaft 54. The purpose for and manner of operation of the hydraulic generator/motor 57 and the hydraulic energy storage device 58 will also be explained below.

The electric energy storage device 56 and the hydraulic energy storage device 58 are connected to operate one or more accessories 60 that are adapted for use in conjunction with the drive train system 10. The electric energy storage device 56 is adapted to operated one or more electrically operated accessories 60, such as lighting systems, navigation systems, audio systems, and the like. As shown in FIG. 1, one or more of the electrically operated accessories 60 may be directly driven from the electric generator/motor 55. The hydraulic energy storage device 58 is adapted to operated one or more hydraulically operated accessories 60, such as such as steering systems, braking systems, air conditioning systems, and the like. As also shown in FIG. 1, one or more of the hydraulically operated accessories 60 may be directly driven from the hydraulic pump/motor 57. Lastly, as also shown in FIG. 1, the engine 11 may be adapted to operate one or more of accessories 60.

The electro-hydraulic machine 50 can be operated in a variety of modes that can improve the performance of the drive train system 10. Each of the operating modes described below can be accomplished through the use of one or more electrical switches and/or other conventional electrical devices, one or more hydraulic valves and/or other conventional hydraulic devices, and one or more clutches and/or other mechanical devices. The specific arrangement of such electrical, hydraulic, and mechanical devices needed to accomplish each of the operating modes described below is easily within the realm of a person having ordinary skill in the art, and this invention is not intended to be limited to any specific arrangement of same. Additionally, one or more control devices (not shown), such as conventional microprocessors or programmable controllers, may be provided for operating the electro-hydraulic machine 50 in any or all of the various modes. The specific programming and manner of operation of such control devices is also easily within the realm of a person having ordinary skill in the art, and this invention is not intended to be limited to any specific programming or manner of operation of same.

In a first operating mode, the electro-hydraulic machine 50 can be operated as an electric starter to assist in starting the engine 11 after it has been turned off. To accomplish this, electric energy stored in the electric energy storage device 56 is supplied to the electric generator/motor 55. In response thereto, the electric generator/motor 55 is operated as a motor to rotate the output shaft 54 of the electro-hydraulic machine 50. At the same time, the clutch 53 is caused to be engaged. As a result, rotation of the output shaft 54 of the electro-hydraulic machine 50 causes concurrent rotation of the input shaft 53 of the electro-hydraulic machine 50 and, therefore, the input shaft 22 of the power drive unit 20. As discussed above, the engine 11 rotatably drives the input shaft 22 of the power drive unit 20. Thus, when the input shaft 22 of the power drive unit 20, the engine 11 is rotatably driven in a manner similar to a conventional starter motor (not shown). Thus, in this first operating mode, the electro-hydraulic machine 50 can be operated as an electric starter to assist in starting the engine 11.

In a second operating mode, the electro-hydraulic machine 50 can be operated as a hydraulic starter to assist in starting the engine 11 after it has been turned off. To accomplish this, hydraulic energy stored in the hydraulic energy storage device 58 is supplied to the hydraulic pump/motor 57. In response thereto, the hydraulic pump/motor 57 is operated as a motor to rotate the output shaft 54 of the electro-hydraulic machine 50. At the same time, the clutch 53 is caused to be engaged. As a result, rotation of the output shaft 54 of the electro-hydraulic machine 50 causes concurrent rotation of the input shaft 53 of the electro-hydraulic machine 50 and, therefore, the input shaft 22 of the power drive unit 20. As discussed above, the engine 11 rotatably drives the input shaft 22 of the power drive unit 20. Thus, when the input shaft 22 of the power drive unit 20, the engine 11 is rotatably driven in a manner similar to a conventional starter motor (not shown). Thus, in this second operating mode, the electro-hydraulic machine 50 can be operated as a hydraulic starter to assist in starting the engine 11.

In a third operating mode, the electro-hydraulic machine 50 can be operated as an electrically-oriented source of either electrical or hydraulic energy to some or all of the accessories 60. Electrical energy stored in the electric energy storage device 56 can be supplied directly to one or more of the electrically operated accessories 60, as mentioned above. Additionally, hydraulic energy stored in the hydraulic energy storage device 58 can be supplied directly to one or more of the hydraulically operated accessories 60 by supplying the electrical energy stored in the electric energy storage device 56 to the electric generator/motor 55. In response thereto, the electric generator/motor 55 is operated as a motor to rotate the output shaft 54 of the electro-hydraulic machine 50. At the same time, the clutch 53 is caused to be disengaged. Rotation of the output shaft 54 of the electro-hydraulic machine 50 rotatably drives the hydraulic pump/motor 57. The hydraulic pump/motor 57 is thus operated as a pump to supply hydraulic energy to one or more of the hydraulically operated accessories 60. Thus, in this third operating mode, the electro-hydraulic machine 50 can be operated as an electrically-oriented source of either electrical or hydraulic energy to some or all of the accessories 60.

In a fourth operating mode, the electro-hydraulic machine 50 can be operated as a hydraulically-oriented source of either electrical or hydraulic energy to some or all of the accessories 60. Hydraulic energy stored in the hydraulic energy storage device 58 can be supplied directly to one or more of the hydraulically operated accessories 60, as mentioned above. Additionally, electric energy stored in the electric energy storage device 56 can be supplied directly to one or more of the electrically operated accessories 60 by supplying the hydraulic energy stored in the hydraulic energy storage device 58 to the hydraulic pump/motor 57. In response thereto, the hydraulic pump/motor 57 is operated as a motor to rotate the output shaft 54 of the electro-hydraulic machine 50. At the same time, the clutch 53 is caused to be disengaged. Rotation of the output shaft 54 of the electro-hydraulic machine 50 rotatably drives the electric generator/motor 55. The electric generator/motor 55 is thus operated as a generator to supply electric energy to one or more of the electrically operated accessories 60. Thus, in this fourth operating mode, the electro-hydraulic machine 50 can be operated as a hydraulically-oriented source of either electrical or hydraulic energy to some or all of the accessories 60.

In a fifth operating mode, the electro-hydraulic machine 50 can be operated as a mechanical alternator to supply electrical energy to one or more of the electrically operated accessories 60 without the use of the electric energy storage device 56. To accomplish this, the engine 11 is operated while the clutch 53 is engaged. As a result, the output shaft 54 of the electro-hydraulic machine 50 is rotatably driven by the engine 11. Rotation of the output shaft 54 of the electro-hydraulic machine 50 rotatably drives the electric generator/motor 55. The electric generator/motor 55 is thus operated as a generator to supply electric energy to one or more of the electrically operated accessories 60. Thus, in this fifth operating mode, the electro-hydraulic machine 50 can be operated as a mechanical alternator to supply electrical energy to one or more of the electrically operated accessories 60 without the use of the electric energy storage device 56.

In a sixth operating mode, the electro-hydraulic machine 50 can be operated as a mechanical pressure pump to supply hydraulic energy to one or more of the hydraulically operated accessories 60 without the use of the hydraulic energy storage device 58. To accomplish this, the engine 11 is operated while the clutch 53 is engaged. As a result, the output shaft 54 of the electro-hydraulic machine 50 is rotatably driven by the engine 11. Rotation of the output shaft 54 of the electro-hydraulic machine 50 rotatably drives the hydraulic pump/motor 57. The hydraulic pump/motor 57 is thus operated as a pump to supply hydraulic energy to one or more of the hydraulically operated accessories 60. Thus, in this sixth operating mode, the electro-hydraulic machine 50 can be operated as a mechanical pressure pump to supply hydraulic energy to one or more of the hydraulically operated accessories 60 without the use of the hydraulic energy storage device 58.

In a seventh operating mode, the electro-hydraulic machine 50 can be operated as an electrically-oriented source of rotational power to supplement the amount of rotational power that is supplied from the engine 11 to the drive train system 10. To accomplish this, the engine 11 is operated while the clutch 53 is engaged. At the same time, electric energy stored in the electric energy storage device 56 is supplied to the electric generator/motor 55. In response thereto, the electric generator/motor 55 is operated as a motor to rotate the output shaft 54 of the electro-hydraulic machine 50. At the same time, the clutch 53 is caused to be engaged. As a result, supplemental rotational power is supplied from the electro-hydraulic machine 50 to the input shaft 22 of the power drive unit 20. Thus, in this seventh operating mode, the electro-hydraulic machine 50 can be operated as an electrically-oriented source of rotational power to supplement the amount of rotational power that is supplied from the engine 11 to the drive train system 10.

In an eighth operating mode, the electro-hydraulic machine 50 can be operated as a hydraulically-oriented source of rotational power to supplement the amount of rotational power that is supplied from the engine 11 to the drive train system 10. To accomplish this, the engine 11 is operated while the clutch 53 is engaged. At the same time, hydraulic energy stored in the hydraulic energy storage device 58 is supplied to the hydraulic pump/motor 57. In response thereto, the hydraulic pump/motor 57 is operated as a motor to rotate the output shaft 54 of the electro-hydraulic machine 50. At the same time, the clutch 53 is caused to be engaged. As a result, supplemental rotational power is supplied from the electro-hydraulic machine 50 to the input shaft 22 of the power drive unit 20. Thus, in this eighth operating mode, the electro-hydraulic machine 50 can be operated as a hydraulically-oriented source of rotational power to supplement the amount of rotational power that is supplied from the engine 11 to the drive train system 10.

In a ninth operating mode, the electro-hydraulic machine 50 can be operated as either an electrically-oriented torsional damper or a hydraulically-oriented torsional damper for the engine 11. To accomplish this, supplemental rotational power is supplied from the electro-hydraulic machine 50 to the engine 11 of the drive train system 10 as described above in connection with the seventh or eighth operating modes. However, the application of such supplemental rotational power selected to be similar in magnitude and opposite in phase from any torque ripple that is generated in the input shaft 22 of the power drive unit 20 by the engine 11. The detection and measurement of the magnitude and phase of such torque ripple can be made in any conventional manner, and the various components of the electro-hydraulic machine 50 (including the clutch 53, the electric generator/motor 55, and the hydraulic pump/motor 57) can be operated to achieve the desired reduction or cancelation of the torque ripple that is generated in the input shaft 22 of the power drive unit 20 by the engine 11. Thus, in this ninth operating mode, the electro-hydraulic machine 50 can be operated as either an electrically-oriented torsional damper or a hydraulically-oriented torsional damper for the engine 11.

In a tenth operating mode, the electro-hydraulic machine 50 can be operated as either an electrically-oriented brake or a hydraulically-oriented brake to selectively retard the rotation of the input shaft 22 of the power drive unit 20. To accomplish this, the clutch 53 is caused to be engaged when it is desired to retard the rotation of the input shaft 22 of the power drive unit 20. When the clutch 53 is engaged, the input shaft 22 of the power drive unit 20 rotatably drives the output shaft 54 of the electro-hydraulic machine 50. As a result, both the electric generator/motor 55 and the hydraulic pump/motor 57 are rotatably driven. The loads imposed by the electric generator/motor 55 and the hydraulic pump/motor 57 retard the rotation of the output shaft 54 of the electro-hydraulic machine 50 and, therefore, the input shaft 22 of the power drive unit 20. At the same time, the electric generator/motor 55 is operated as a generator to supply electrical energy to the electric energy storage device 56, and the hydraulic pump/motor 57 is operated as a pump to supply hydraulic energy to the hydraulic energy storage device 58. Thus, in this tenth operating mode, the electro-hydraulic machine 50 can be operated as either an electrically-oriented engine brake or a hydraulically-oriented engine brake to selectively retard the rotation of the input shaft 22 of the power drive unit 20.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A combined hybrid drive system and electro-hydraulic machine for use on a vehicle having an engine, a rotatably driven mechanism, and an electric or hydraulic accessory, the combined hybrid drive system and electro-hydraulic machine comprising:
   a hybrid drive system that is adapted to decelerate a rotatably driven mechanism provided on a vehicle, accumulate the energy resulting from such deceleration, and use the accumulated energy to subsequently accelerate the rotatably driven mechanism; and an electro-hydraulic machine operatively connected to the hybrid drive system and adapted to be operated in a plurality of operating modes to operate one of an electric or hydraulic accessory provided on the vehicle when an engine of the vehicle is not operated.

2. The combined hybrid drive system and electro-hydraulic machine defined in claim 1 wherein the electro-hydraulic machine includes an electric generator/motor that is operatively connected to the hybrid drive system and an electric energy storage device that is operatively connected to the electric generator/motor.

3. The combined hybrid drive system and electro-hydraulic machine defined in claim 2 wherein the electric generator/motor and the electric energy storage device are connected to operate as an electric starter for the hybrid drive system.

4. The combined hybrid drive system and electro-hydraulic machine defined in claim 2 further including one or more electrically operated accessories, and wherein the electric generator/motor and the electric energy storage device are connected to operate as an electrically-oriented source of electrical energy to some or all of the electrically operated accessories.

5. The combined hybrid drive system and electro-hydraulic machine defined in claim 2 further including one or more electrically operated accessories, and wherein the electric generator/motor is connected to be operated by the hybrid drive system as a mechanical alternator to supply electrical energy to one or more of the electrically operated accessories.

6. The combined hybrid drive system and electro-hydraulic machine defined in claim 2 wherein the electric generator/motor and the electric energy storage device are connected to operate as an electrically-oriented source of rotational power to supplement rotational power generated by the hybrid drive system.

7. The combined hybrid drive system and electro-hydraulic machine defined in claim 2 wherein the electric generator/motor and the electric energy storage device are connected to operate as an electrically-oriented torsional damper for the hybrid drive system.

8. The combined hybrid drive system and electro-hydraulic machine defined in claim 2 wherein the electric generator/motor and the electric energy storage device are connected to operate as an electrically-oriented brake for the hybrid drive system.

9. The combined hybrid drive system and electro-hydraulic machine defined in claim 1 wherein the electro-hydraulic machine includes a hydraulic pump/motor that is operatively connected to the hybrid drive system and a hydraulic energy storage device that is operatively connected to the hydraulic pump/motor.

10. The combined hybrid drive system and electro-hydraulic machine defined in claim 9 wherein the hydraulic pump/motor and the hydraulic energy storage device are connected to operate as a hydraulic starter for the hybrid drive system.

11. The combined hybrid drive system and electro-hydraulic machine defined in claim 9 further including one or more hydraulically operated accessories, and wherein the hydraulic pump/motor and the hydraulic energy storage device are connected to operate as a hydraulically-oriented source of hydraulic energy to some or all of the hydraulically operated accessories.

12. The combined hybrid drive system and electro-hydraulic machine defined in claim 9 further including one or more hydraulically operated accessories, and wherein the hydraulic pump/motor is connected to be operated by the hybrid drive system as a hydraulic pressure pump to supply hydraulic energy to one or more of the hydraulically operated accessories.

13. The combined hybrid drive system and electro-hydraulic machine defined in claim 9 wherein the hydraulic pump/motor and the hydraulic energy storage device are connected to operate as a hydraulically-oriented source of rotational power to supplement rotational power generated by the hybrid drive system.

14. The combined hybrid drive system and electro-hydraulic machine defined in claim 9 wherein the hydraulic pump/motor and the hydraulic energy storage device are connected to operate as a hydraulically-oriented torsional damper for the hybrid drive system.

15. The combined hybrid drive system and electro-hydraulic machine defined in claim 9 wherein the hydraulic pump/motor and the hydraulic energy storage device are connected to operate as a hydraulically-oriented brake for the hybrid drive system.

16. The combined hybrid drive system and electro-hydraulic machine defined in claim 1 wherein the electro-hydraulic machine includes an electric generator/motor and a hydraulic pump/motor that are each operatively connected to the hybrid drive system, an electric energy storage device that is operatively connected to the electric generator/motor, and a hydraulic energy storage device that is operatively connected to the hydraulic pump/motor.

17. A drive train system comprising:
an engine that is adapted to operate an electric or hydraulic accessory;
an axle assembly including a rotatably driven mechanism;
a hybrid drive system connected between the engine and the axle assembly, the hybrid drive system being adapted to decelerate the rotatably driven mechanism, accumulate the energy resulting from such deceleration, and use the accumulated energy to subsequently accelerate the rotatably driven mechanism; and
an electro-hydraulic machine operatively connected to the hybrid drive system and adapted to be operated in a plurality of operating modes to operate one of an electric or hydraulic accessory when the engine is not operated.

* * * * *